F. W. BUTT.
ATTACHMENT FOR CHAIRS.
APPLICATION FILED FEB. 1, 1908.
948,309.
Patented Feb. 8, 1910.
2 SHEETS—SHEET 1.
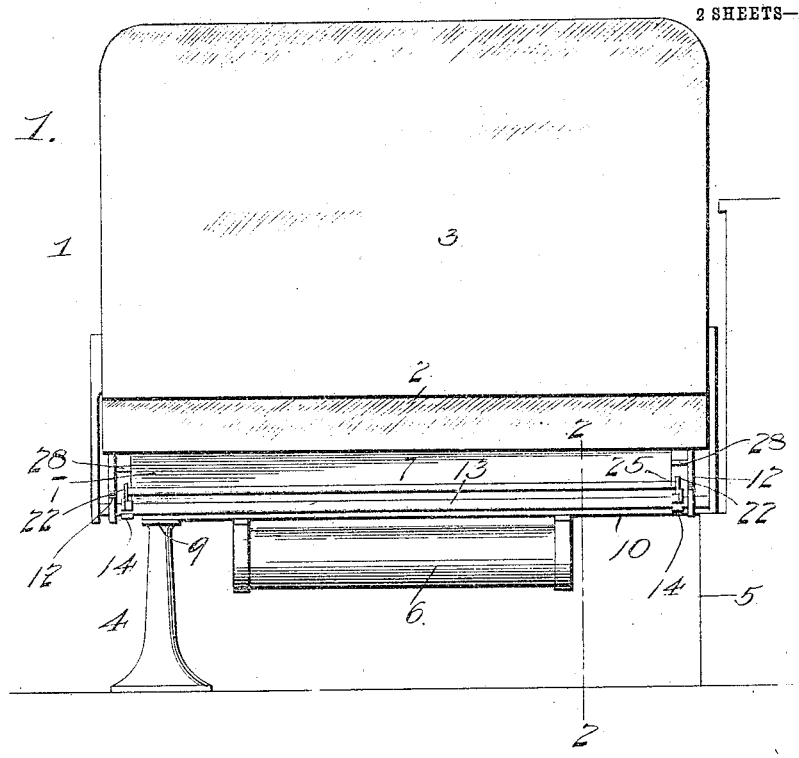
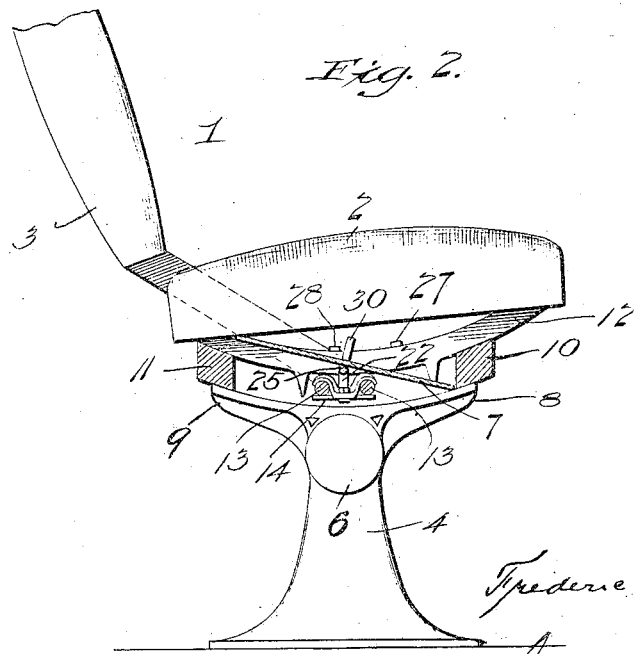

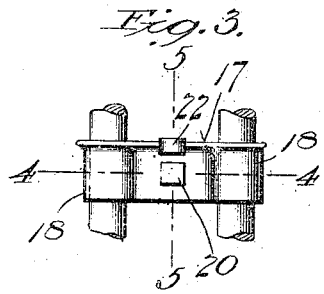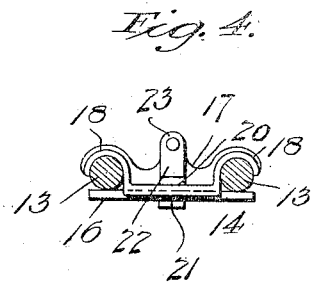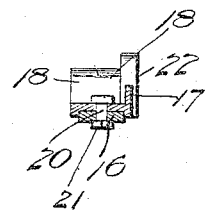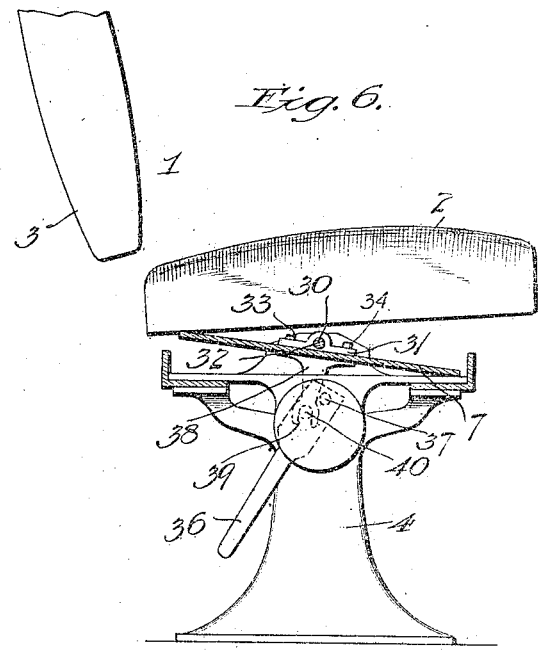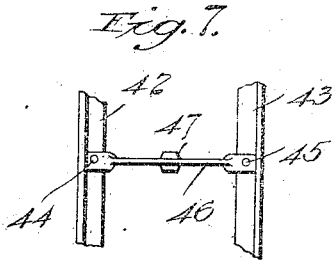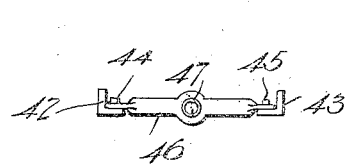

UNITED STATES PATENT OFFICE.

FREDERIC WARD BUTT, OF BROOKLYN, NEW YORK, ASSIGNOR OF TWO-THIRDS TO CORNELL S. HAWLEY, OF NEW YORK, N. Y.

ATTACHMENT FOR CHAIRS.

948,309. Specification of Letters Patent. Patented Feb. 8, 1910.

Application filed February 1, 1908. Serial No. 413,887.

*To all whom it may concern:*

Be it known that I, FREDERIC WARD BUTT, residing at Brooklyn, in the county of Kings and State of New York, have invented certain Improvements in Attachments for Chairs, of which the following is a specification.

This invention relates to attachments for chairs which are provided with heat radiators placed beneath their seats, and it is particularly applicable to chairs of the kind used in passenger cars and called car seats.

The object of this invention is to provide a simple, inexpensive device, readily attached to any form of car seat, which deflects the heated air rising from the heat radiator to one side of the seat, and prevents the body of the seat as well as the protected sides of the seat from becoming unduly heated, thereby obviating one of the discomforts of traveling.

The present invention provides means for keeping the heated air in constant motion and prevents any part of it from becoming pocketed beneath the car seat.

Car seats are usually reversible, that is to say, they are usually provided with parts which may be so moved that passengers occupying them may face in either one of two directions. Accordingly this device may be so arranged as to be actuated automatically by a movable part of the car seat so that whatever position the car seat may be made to assume, the heated air is deflected to the rear side of the seat.

Referring to the drawings. Figure 1 is a rear elevation of a car seat to which a heat deflector is attached, cross-piece 11 being omitted from the drawing to prevent obscuring it. Fig. 2 is a section on line 2—2 of Fig. 1, the back of the car seat being broken away at its top. Figs. 3, 4, and 5 are detail views of means for securing a heat deflector to a car seat, Fig. 3 being a plan view, Fig. 4, a section on line 4—4 of Fig. 3, and Fig. 5, a section on line 5—5 of Fig. 3. Fig. 6 is a sectional view of another form of car seat which is provided with a heat deflector, the back of the car seat being broken away at its top. Fig. 7 is a detail plan view of modified means for securing a heat deflector to a car seat. Fig. 8 is a detail side view of the subject matter shown in Fig. 7.

Car seat 1, comprising a seat 2 and a back 3, supported at one end as by a standard 4, and at the other end as by car side 5, is representative of any form of chair which may be provided with a heat radiator 6, placed beneath the seat. The heat radiator may be operated by any suitable heating medium, such as electricity, steam, or hot water, heat radiator 6 shown in the drawings being operated by electricity. The car seats shown in the drawings are of the reversible type, that is to say, they are provided with movable parts that may be adjusted to adapt the car seats for use by passengers facing in either one of two directions.

The mechanism by which the movable parts are reversed is not shown in the drawings, since it is well understood and would serve only to complicate them if included.

An inclined heat deflector 7 extends between the seat 2 and the heat radiator 6. When the heat deflector is described as inclined, it is to be understood that it is inclined to or makes an angle with a horizontal line drawn through it. The inclination of the heat deflector causes it to deflect the heated air rising from the heat radiator as soon as it strikes the deflector, thus keeping the heated air in constant motion and preventing any of it from being pocketed under the seat. The advantage of this construction is evident, for, when heated air is pocketed by a deflector, it soon overheats it and the heat is transmitted in turn to the body of the seat and to the front side of the seat.

Heat deflector 7 is preferably a single plane member secured to a car seat in any suitable manner, preferred means for securing a deflector to a car seat being described below. The heat deflector is shown attached to a different form of car seat in Figs. 1 and 2 from that represented in Fig. 6, and the means of connection between the deflector and the car seats, or in other words, the supports for the deflector, also differ in structure, but the deflector itself is essentially the same in both sets of figures, the variety of views being given to illustrate the adaptability of the invention to any form of car seat.

Referring to Figs. 1 to 5, inclusive, standard 4 is provided with arms 8 and 9 which coöperate with the car side 5 to support cross-pieces 10 and 11, upon which rest runners 12 attached to and supporting seat 2. Heat deflector 7 is secured to rods 13 as by supports 14, one of which will now be described. Support 14 comprises a base plate 16 and a gripping member 17 provided with curved arms 18 which fit over rods 13. The base plate rests against the under sides of rods 13, and the gripping member and the base plate are held firmly together and in place upon rods 13, as by a bolt 20 and nut 21. Gripping member 17 is provided with a lug 22 carrying a bearing 23 for the reception of a journal 25 upon heat deflector 7, preferably at a central point in its end. The other end of the heat deflector having a similar journal supported by the other support 14 in the manner described above, the heat deflector may be rotated on its axis to the extent permitted by the several parts of the car seat. It is only necessary that the deflector be capable of rotation so as to rest in either one of two positions, one being illustrated in Figs. 1, 2, and 6, and the other being that which it assumes when the movable parts of the car seat are reversed, the angle of inclination of the deflector then being reversed so that the deflector deflects the heated air to the other side of the seat, which has become its rear side. In the form of embodiment of the invention shown in the drawings the heat deflector is automatically actuated to a position in which its angle of inclination is reversed by a movable part of the car seat, when the car seat is reversed.

Referring particularly to Figs. 1 and 2, a runner 12 is provided with inwardly extending studs 27 and 28, and heat deflector 7 is provided with a projection 30. When the car seat is reversed from the position shown in Figs. 1 and 2, back 3 swings over to the other side of seat 2, the seat moves to the left upon its runners 12, and stud 27 strikes projection 30, thereby partially rotating the deflector and reversing its angle of inclination. Stud 27 being closely adjacent to projection 30 in the new position, holds it in the new position, and heat deflector 7 cannot be accidentally rotated by the movement of the car or by other agencies. The operation of the device in the return movement of the car seat is similar to that described above, excepting that stud 28, instead of stud 27, actuates the deflector.

Referring to Fig. 6 of the drawings, heat deflector 7 is revolubly mounted upon a rod 30 as by supports 31, one of which is shown in the drawing. Support 31 is provided with an aperture 32 for the reception of rod 30, and is secured to heat deflector 7 as by bolts and nuts 33 and 34. In this type of car seat not only the back and seat are moved when the car seat is reversed, but a foot rest 36, mounted as upon a pivot 37, also swings from one side of standard 4 to the other. Heat deflector 7 is provided with a downwardly extending arm 38, preferably having a slot 39 in its lower end. This slot engages a stud 40 upon the foot rest 36, so that when the car seat is reversed and the foot rest swings to the other side of standard 4, the foot rest rotates heat deflector 7 until its angle of inclination is reversed, and it is held firmly in its new position until the car seat is again reversed.

In Figs. 7 and 8 a modified form of support for heat deflector 7 is shown. Many car seats do not have rods beneath the seats suitably placed to support the deflector, and in those cases the present support may be used. 42 and 43 represent seat rails to which the member 46 is attached, as by bolts and nuts 44 and 45. Member 46 is provided with a bearing 47, adapted to receive a journal upon heat deflector 7.

I claim as my invention:

1. The combination with a reversible car seat, of a heat radiator, an inclined reversible pivoted heat deflector, and means for automatically actuating said reversible pivoted member on reversing the seat.

2. The combination with a reversible car seat, of a heat radiator, an inclined heat deflector, and means for automatically reversing the angle of inclination of the heat deflector when the car seat is reversed.

3. The combination with a car seat having a movable part, of a heat radiator, and an inclined heat deflector, the inclination of said deflector being reversed by movement of said movable part.

4. The combination with a car seat having a movable seat, of a heat radiator, and an inclined heat deflector between the seat and the radiator, the inclination of said deflector being reversed by movement of said seat.

5. The combination with a seat, runners movably supporting said seat, a heat radiator, an inclined heat deflector between said seat and said radiator, a projection upon said deflector, and studs upon said runners adapted to coöperate separately with said projection to reverse the angle of inclination of said deflector when the seat is moved.

6. The combination with a seat of a heat-deflector, a normally inclined plane member provided at opposite ends with journals for pivotally supporting the same in position, means for effecting the reversal of the inclination of said deflector, and means for holding said deflector in inclined position.

7. A device of the character described, comprising a seat, a heat radiator, a normally inclined reversible heat deflector, means for effecting the reversal of the inclination of said deflector with the movement of said seat and means for holding the heat-deflector in inclined position.

8. The combination with a reversible car seat, of a heat radiator, and a revoluble heat deflector between the seat and the heat radiator, so inclined as to deflect the heat to the rear of the seat, means for effecting the reversal of the inclination of said deflector with the reversal of said car seat.

9. The combination with a reversible car seat, of a heat radiator, and a heat deflector between the seat and the heat radiator, the heat deflector being inclined at an angle the revers of that of the car seat, means for effecting the reversal of the inclination of said deflector with the reversal of said car seat.

10. The combination with a seat, of a heat radiator, a revoluble heat deflector, and means upon the seat for holding the heat deflector in an inclined position, means for effecting the reversal of the inclination of said deflector with the reversal of said car seat.

11. A device of the character described, comprising a reversible seat an inclined heat deflector, and means for automatically reversing the angle of inclination of said deflector with the changing of the angle of inclination of said seat.

In testimony whereof I have hereunto signed my name in the presence of two subscribing witnesses.

FREDERIC WARD BUTT.

Witnesses:
   CHAS. W. SHERWOOD,
   CHAS. C. BOWERS.